US006529191B1

(12) United States Patent
Ryo

(10) Patent No.: US 6,529,191 B1
(45) Date of Patent: Mar. 4, 2003

(54) DATA PROCESSING APPARATUS AND DATA PROCESSING METHOD

(75) Inventor: Kamiya Ryo, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/207,098

(22) Filed: Dec. 7, 1998

(30) Foreign Application Priority Data

Dec. 10, 1997 (JP) .......................................... 9-340201

(51) Int. Cl.[7] .......................................... G06T 15/00

(52) U.S. Cl. ...................... 345/419; 345/582; 345/589; 345/629; 345/532; 345/717; 381/61

(58) Field of Search ............................ 345/430, 431, 345/502, 419, 582, 589, 539, 534, 532, 717, 716, 629; 84/603, 604; 710/68; 348/13; 358/502; 382/232; 381/61

(56) References Cited

U.S. PATENT DOCUMENTS 5,652,797 A * 7/1997 Okamura et al. ............ 381/61
5,789,690 A * 8/1998 Furuhashi et al. ........... 84/633
5,831,193 A * 11/1998 Suzuki et al. ................ 84/603
5,896,403 A * 4/1999 Nagasaki et al. .......... 371/37.1
5,942,707 A * 8/1999 Tamura ....................... 84/604
6,137,046 A * 10/2000 Kamiya ....................... 84/604

* cited by examiner

*Primary Examiner*—Mark Zimmerman
*Assistant Examiner*—Kimbinh T. Nguyen
(74) *Attorney, Agent, or Firm*—Morrison & Foerster LLP

(57) ABSTRACT

A data processing apparatus generates original waveform data based upon which musical tone data are to be generated, and sounding control data containing kind information indicative of kinds of the original waveform data and pitch information indicative of pitches of the musical tone data, and generates original image data based upon which image data are to be generated, and picture control data containing kind information indicative of kinds of the original image data and coordinate information indicative of coordinates of the image data on a display screen. An arithmetic processing device performs arithmetic processing comprising interpolation processing or thinning processing and is operable upon receiving the sounding control data, for carrying out a first generating process for generating the musical tone data, by subjecting the original waveform data designated by the kind information to the arithmetic processing according to the pitch information, and operable upon receiving the original image data, for carrying out a second generating process for generating the image data, by subjecting the original image data designated by the kind information to the arithmetic processing according to the coordinate information. Preferably, the arithmetic processing device executes the first generating process and the second generating process in a time-sharing manner.

13 Claims, 5 Drawing Sheets

DATA PROCESSING APPARATUS AND DATA PROCESSING METHOD

BACKGROUND OF THE INVENTION

1. Field of the Invention

The present invention relates to a data processing apparatus and a data processing method which perform 3D graphic processing using texture data and also perform sound processing using wave table data.

2. Prior Art

In recent years, personal computers have been developed which are capable of not only performing text inputting and computation but also performing image processing called 3D graphics and sound processing. The 3D graphics comprises inputting a geometry described by triangular polygons, and processing the geometry using parameters such as view point and lighting to generate a three-dimensional image. The sound processing comprises storing in a memory waveform data obtained by sampling various effect sounds, as wave table data, reading out data from the memory in required timing, and subjecting the readout data to pitch conversion, etc. to obtain desired musical tone data. Such graphic processing and sound processing are useful in representing effects with high presence in fields of amusement such as game machines.

In personal computers provided with functions of such graphic processing and sound processing, the graphic processing and the sound processing are generally carried out separately or independently of each other, since they use respectively image data and musical tone data which are different in nature.

FIG. 1 shows the essential parts of a conventional personal computer related to graphic processing and sound processing. This personal computer is mainly comprised of a CPU that produces image control data Dgc and musical tone control data Dsc, a graphic processing system A, a sound processing system B, and a PCI bus connecting between these components. The graphic control system A is integrated on a piece of circuit board called "video card", and the sound processing system B is integrated on a piece of circuit board called "sound card". These circuit boards can be mounted into a personal computer by inserting them into expansion slots, like PC cards in general.

In the illustrated example, the image control data Dgc is comprised of polygon data Dp and texture data Dt. The polygon data Dp represents vertex coordinates indicative of three-dimensional triangles and texture addresses corresponding to the respective vertices or apexes, and the texture data Dt represents bit patterns used for drawing the inside of polygons. The musical tone control data Dsc is comprised of wave table data Dw corresponding to various tone colors obtained by sampling various waveforms and sounding control data Dh.

When the image control data Dgc is delivered from the CPU 1 to the graphic processing system A via the PCI bus 2, it is delivered through a PCI bus interface 21 to be once stored in a 3D graphic temporary buffer 22. Then, the texture data Dt is read out from the 3D graphic temporary buffer 22 and stored in a texture memory 23. The texture data Dt is read out from the texture memory 23 and delivered to a 3D graphic engine 24, according to necessity. The 3D graphic engine 24 performs mapping processing of drawing the inside of a polygon, based on the polygon data Dp and the texture data Dt to produce image data Dg. The produced image data Dg is stored in a frame memory 25. Then, the image data Dg is read out from the frame memory 25 and converted to an analog signal by a RAMDAC 26 to be delivered to a display device, not shown.

On the other hand, when the musical tone control data Dsc is delivered from the CPU 1 to the sound processing system B via the PCI bus 2, it is delivered through a PCI bus interface 31 and once stored in a sound temporary buffer 32. Then, the wave table data Dw is read out from the sound temporary buffer 32 and stored in a WT data memory 33. A WT engine 34 reads out a portion of the wave table data Dw corresponding to a tone color designated by the sounding control data Dh and subjects the readout wave table data Dw to pitch conversion based upon a pitch designated by the sounding control data Dh to produce musical tone data Ds upon receiving the same. An effect processing section 35 causes an effect delay memory 36 to store the musical tone data Ds upon receiving the same, to thereby generate the musical tone data Ds with delay. Based upon the generated musical tone data Ds, effect processing on a time axis such as echo imparting is executed. The musical tone data Ds subjected to effect processing is converted to an analog signal by a DAC 37, which is delivered as a musical tone signal to a sounding device, not shown.

As described above, in the conventional personal computer, the graphic processing system A for generating the image data Dg and the sound processing system B for generating the musical tone data Ds are provided separately to operate independently of each other.

Arithmetic operation carried out by the graphic processing system A and arithmetic operation carried out by the sound processing system B are identical with each other in that they process original data (texture data Dt and wave table data Dw) read out from a memory.

In the conventional personal computer, however, the graphic processing and the sound processing are carried out by separate systems, leading to a complicated construction and increased circuit and system sizes.

SUMMARY OF THE INVENTION

It is the object of the present invention to provide a data processing apparatus and a data processing method which perform graphic processing and sound processing using a common processing system to thereby largely reduce the circuit and system sizes.

To attain the above object, the present invention provides a data processing apparatus comprising a supply device that supplies original waveform data based upon which musical tone data are to be generated, and sounding control data containing kind information indicative of kinds of the original waveform data and pitch information indicative of pitches of the musical tone data, and supplies original image data based upon which image data are to be generated, and picture control data containing kind information indicative of kinds of the original image data and coordinate information indicative of coordinates of the image data on a display screen, and an arithmetic processing device that performs arithmetic processing comprising interpolation processing or thinning processing, the arithmetic processing device being operable upon receiving the sounding control data from the supply device, for carrying out a first generating process for generating the musical tone data, by subjecting the original waveform data designated by the kind information of the sounding control data to the arithmetic processing according to the pitch information of the sounding control data, the arithmetic processing device being operable upon receiving the picture control data from the supply device, for carrying out a second generating process for generating the image data, by subjecting the original image data designated by the kind information of the picture control data to the arithmetic processing according to the coordinate information of the picture control data.

Preferably, the data processing apparatus includes a storage device that stores the original waveform data and the original image data, the arithmetic processing device reading out from the storage device the original waveform data based upon the pitch information of the sounding control data upon receiving the sounding control data, and reading out from the storage device the original image data based upon the coordinate information of the picture control data upon receiving the picture control data.

More preferably, when the image data to be generated is not completely generated by the termination of the each of the time slots, an immediately preceding value of the image data generated is used as a value of a remainder of the image data applied in the each of the time slots.

To attain the above object, the present invention provides a data processing method comprising the steps of supplying original waveform data based upon which musical tone data are to be generated, and sounding control data containing kind information indicative of kinds of the original waveform data and pitch information indicative of pitches of the musical tone data to an arithmetic processing device, and supplying original image data based upon which image data are to be generated, and picture control data containing kind information indicative of kinds of the original image data and coordinate information indicative of coordinates of the image data on a display screen to the arithmetic processing device, and causing the arithmetic processing device, upon receiving the sounding control data, to carry out a first generating process for generating the musical tone data, by subjecting the original waveform data designated by the kind information of the sounding control data to arithmetic processing comprising interpolation processing or thinning processing according to the pitch information of the sounding control data, and causing the arithmetic processing device, upon receiving the picture control data, to carry out a second generating process for generating the image data, by subjecting the original image data designated by the kind information of the picture control data to the arithmetic processing according to the coordinate information of the picture control data.

To attain the above object, the present invention provides a data processing method comprising the steps of supplying original waveform data based upon which musical tone data are to be generated, and sounding control data containing kind information indicative of kinds of the original waveform data, pitch information indicative of pitches of the musical tone data, and volume information indicative of volume of the musical tone data to an arithmetic processing device, and supplying original image data based upon which image data are to be generated, and picture control data containing kind information indicative of kinds of the original image data, coordinate information indicative of coordinates of the image data on a display screen, and transparency information indicative of transparency of the image data to the arithmetic processing device, and causing the arithmetic processing device, upon receiving the sounding control data, to carry out a first generating process for generating the musical tone data, by subjecting the original waveform data designated by the kind information of the sounding control data to arithmetic processing comprising interpolation processing or thinning processing according to the pitch information of the sounding control data, and then executing synthetic processing by synthesizing data obtained by the arithmetic processing according to the volume information of the sounding control data, and causing the arithmetic processing device, upon receiving the picture control data, to carry out a second generating process for generating the image data, by subjecting the original image data designated by the kind information of the picture control data to the arithmetic processing according to the coordinate information of the picture control data, and then executing the synthetic processing by synthesizing data obtained by the arithmetic processing according to the transparency information of the picture control data.

The above and other objects, features, and advantages of the invention will become more apparent from the following detailed description taken in conjunction with the accompanying drawings.

BRIEF DESCRIPTION OF THE DRAWINGS

FIGS. 4A to 4C show how the sound processing is carried out by a 3D graphic and WT tone generator-shared engine in FIG. 2, in which:

FIG. 4A is a graph showing an original waveform to be subjected to sound processing by the engine;

FIG. 4B is a graph showing an interpolated waveform obtained by interpolation by the engine; and FIG. 4C is a graph showing interpolated waveforms obtained by the engine for different simultaneously sounded channels; and FIGS. 5A to 5C show how the graphic processing is carried out by the engine, in which:

FIG. 5A is a view showing texture data Dt in bit map form;

FIG. 5B is a view showing a triangle as a polygon obtained interpolation by the engine; and FIG. 5C is a view showing triangles corresponding to respective different polygons.

DETAILED DESCRIPTION

The present invention will be described in detail with reference to the accompanying drawings showing a preferred embodiment thereof.

Figure 1:
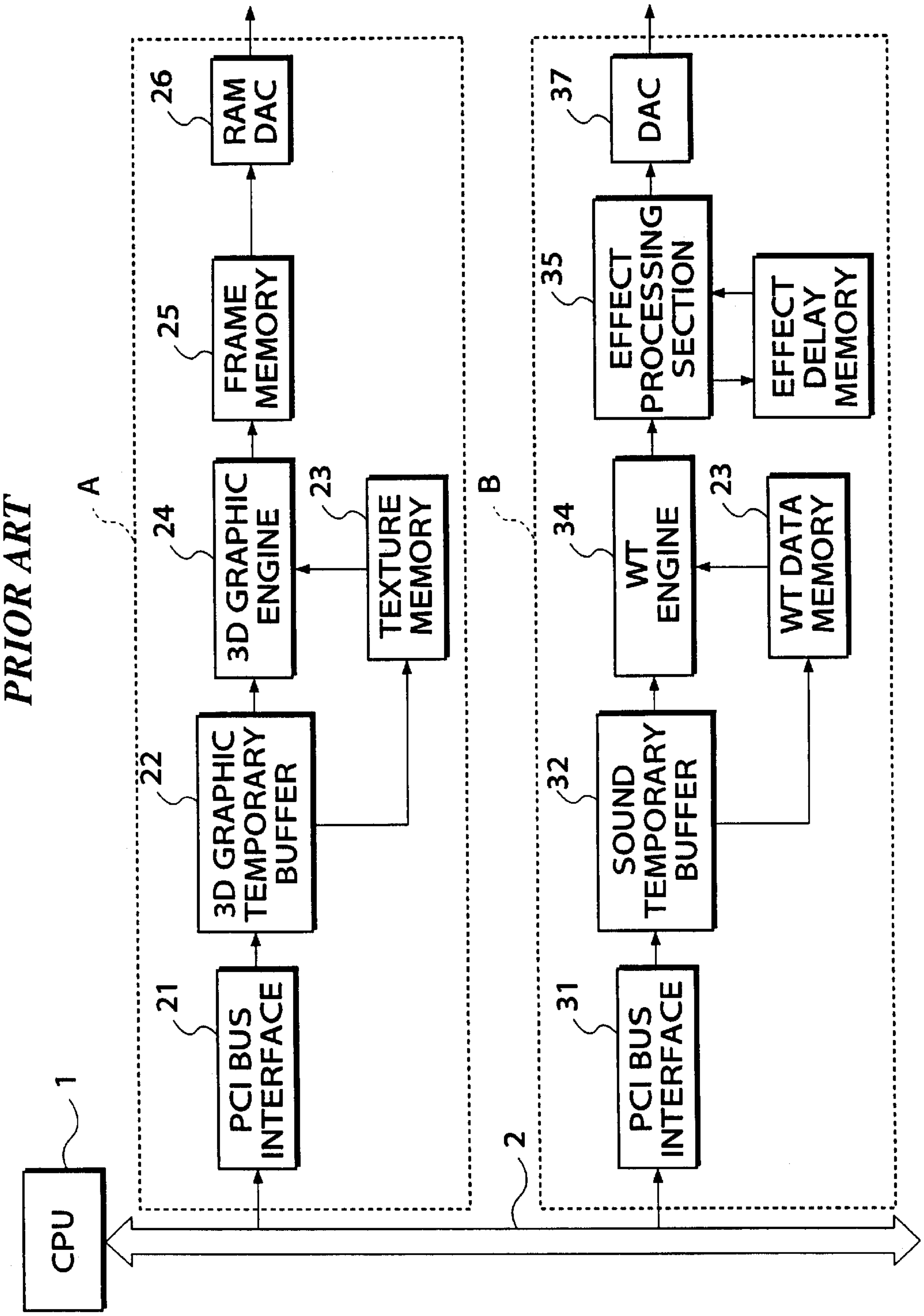
FIG.1 PRIOR ART
FIG. 1 is block diagram showing the arrangement of essential parts of a conventional personal computers related to graphic processing and sound processing.
Figure 2:
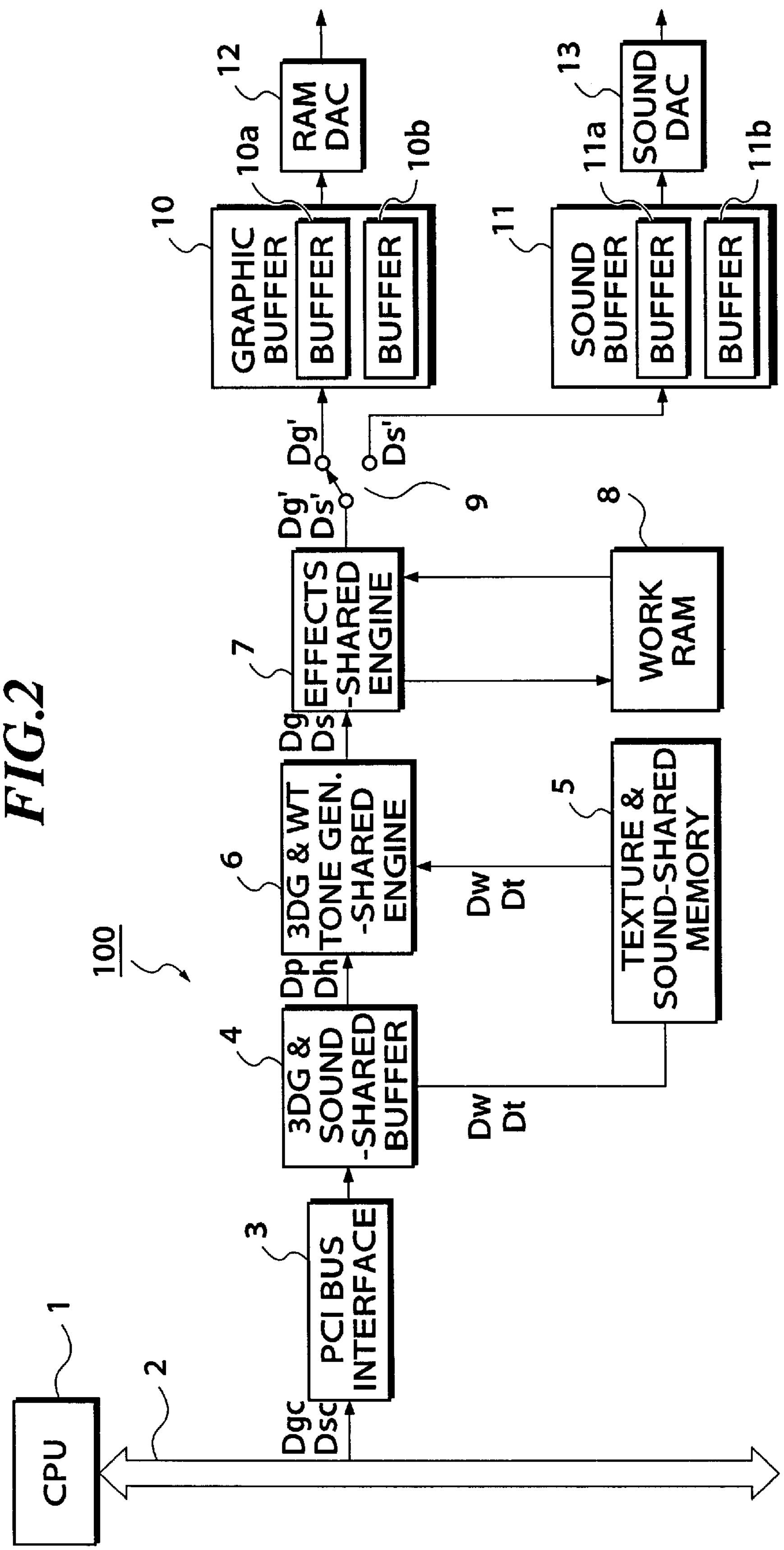
FIG. 2 is a block diagram showing the arrangement of a data processing apparatus according to an embodiment of the present invention.

FIG. 2 shows the arrangement of a data processing apparatus according to an embodiment of the present invention. In the figure, reference numeral 1 designates a CPU, which controls the whole data processing apparatus 100 and produces image control data Dgc and musical tone control data Dsc. The image control data Dgc is comprised of polygon data Dp (picture control data) and texture data Dt (original image data). The texture data Dt is formed of bit patterns used for drawing the inside of polygons such as pattern data and photograph data. The polygon data Dp converts a three-dimensional arrangement of triangles for forming a polygon, obtained by a so-called geometry process, to X, Y and Z coordinates representing vertices of triangles, and also designates texture kind information, texture address information, and transparency information.

The musical tone control data Dsc is comprised of wave table data Dw (original waveform data) corresponding to tone colors obtained by sampling various waveforms, and sounding control data Dh designating parameters related to sounding such as pitch, tone color, volume and effects.

The texture data Dt and the wave table data Dw are not always contained in the image control data Dgc and the musical tone control data Dsc, but are added to the latter data depending upon the contents of processing to be carried out. To this end, these data Dt and Dw can be read out from a hard disk, not shown, by the CPU 1 at the start of processing.

Reference numeral 2 designates a PCI bus, which can transfer data at a high speed. The PCI bus 2 transfers both data and address using a 32 bit width (or 64 bit width). The PCI bus 2 operates on a clock of 33 MHz and has a theoretical maximum transfer speed of 132 bytes/sec (or 264 bytes/sec). The PCI bus 2 supports a bus master function which can realize reduction of load on a high-speed DMA not controlled by a general purpose DMA controller as well as on a CPU.

The PCI bus 2 also has a burst transmission mode not supported by an ISA bus. The burst transmission mode is a mode for continuously transferring a plurality of pieces of data upon single address designation, and use of this burst transmission mode can achieve high-speed reading out continuous data from a DRAM (Dynamic RAM) provided with the burst transmission mode, hereinafter referred to. Further, the PCI bus has the advantage that an interface connected to the bus can be manufactured at a low cost. The PCI bus 2 is employed for the above-mentioned reasons, but any other expansion bus other than the PCI bus 2 may be employed insofar as it has the above-mentioned characteristics.

Reference numeral 3 designates a PCI bus interface, which receives the image control data Dgc and the musical tone control data Dsc from the PCI bus 2 and delivers them to a device at a later stage. Reference numeral 4 designates a 3D graphic (hereinafter referred to as "3DG") and sound-shared buffer which may be formed of FIFO. The buffer 4 once stores the image control data Dgc and the musical tone control data Dsc delivered from the PCI bus interface 3, from which data is read out according to necessity. Thus, a common memory is used to temporarily store the image control data Dgc and the musical tone control data Dsc. That is, separate memories are not provided for storing the image control data Dgc and the musical tone control data Dsc, respectively, which curtails the number of memories used, and also curtails the board area required for providing the memories and the board area required for wiring of I/O ports thereof. Moreover, a single common memory control system can suffice to simplify the memory management.

Reference numeral 5 designates a texture and sound-shared memory which is formed by a RAM or the like. This texture and sound-shared memory 5 stores the texture data Dt and the wave table data Dw. Similarly to the 3DG and sound-shared buffer 4, the memory 5 is also used for both the image processing and the sound processing, thereby enabling curtailment of the number of memories used and the board area and hence simplifying the memory management.

Reference numeral 6 designates a 3DG and WT tone generator-shared engine. This engine 6 has an arithmetic section formed of hardware, for carrying out interpolation processing, thinning processing and synthesis processing, and is able to perform various kinds of processing by changing parameters applied to the processing. The 3DG and WT tone generator-shared engine 6 performs graphic processing based upon the image control data Dgc and generates image data Dg expanded over a bit map, and also performs sound processing based upon the musical tone control data Dsc to generate musical tone data Ds. In the present embodiment, time-sharing processing is carried out so as to execute the sound processing preferentially.

The sound processing by the 3DG and WT tone generator-shared engine 6 is performed in the following manner:

A portion of the wave table data Dw corresponding to a tone color designated by the sounding control data Dh is read out from the texture and sound-shared memory 5. Interpolation processing or thinning processing are carried out on the readout wave table data Dw, according to a pitch designated by the sounding control data Dh, to generate musical tone data Ds. In the case of generating a plurality of musical tones simultaneously, a plurality of the musical tone data Ds are generated in the above-mentioned manner, and each of the generated plural musical tone data Ds is multiplied by a coefficient corresponding to volume information indicated by the sounding control data Dh, and the plural musical tone data Ds each multiplied by the coefficient are synthesized by adding them together into one musical tone data Ds. Therefore, the time required for generating the musical tone data Ds varies with the number of musical tones to be simultaneously sounded.

On the other hand, the graphic processing by the 3DG and WT tone generator-shared engine 6 is performed in the following manner:

Required texture data Dt is read out from the texture and sound-shared memory 6 according to a kind of texture data Dt and address information designated by the polygon data Dp, and then the readout texture data Dt is subjected to mapping according to coordinates of vertices of a polygon to be depicted, to generate image data Dg expanded over a display screen of the display device. The mapping is carried out while the texture data Dt is subjected to interpolation processing or thinning processing depending upon the inclination of the polygon and required expansion or contraction of the same. In this connection, to represent a transparent object such as a scene through a window, it is required to carry out processing of laying two kinds of pictures, i.e. the window pane and the scene, one over the other. The transparency information included in the polygon data Dp is used in such a case. More specifically, a plurality of the image data Dg corresponding to a certain region on the display screen are generated, the plural image data Dg are each multiplied by a coefficient corresponding to the transparency information, and the plural image data Dg multiplied by the coefficient are synthesized by adding them together into synthesized image data ($\alpha$ blending processing).

A comparison between the sound processing and the graphic processing described above reveals that the two kinds of processing are identical with each other in that original data to be processed, i.e. the wave table data Dw or the texture data Dt, is subjected to interpolation processing or thinning processing into intermediate data, and a plurality of the intermediate data are synthesized into final data, i.e. the musical tone data Ds or the image data Dg. The present embodiment pays attention to such processes common to the sound processing and the graphic processing, and provides the common engine 6 for executing such common processes.

A problem to be en countered in realizing such sharing is that one processing takes time to complete so that the other processing cannot be completed in time. For example, to depict a complicated picture, the graphic processing takes a long time to complete, so that the sound processing cannot be completed within an accordingly shortened time. One way to eliminate this is to hold the musical tone data Ds at a last value thereof. However, the resulting sound is aurally unnatural. On the other hand, one way to eliminate the problem by means of the image data Dg is to freeze a certain frame. The freezing of a frame does not cause a visually noticeable change in the reproduced image, providing almost no unnaturalness visually. Therefore, in the present embodiment, the graphic processing and the sound processing are carried out in a time-sharing manner such that the sound processing is started immediately after the start of each time slot, and the graphic processing is started after completion of the sound processing. That is, the graphic processing is carried out within a remaining time left after completion of the sound processing.

Reference numeral 7 designates an effects-shared engine, which performs various kinds of effect processing on the musical tone data Ds and the image data Dg generated by the 3DG and WT tone generator-shared engine 6 to generate musical tone data Ds' and image data Dg' which are given effects. Effects for the musical tone data Ds include echo and reverb. In processing for imparting these effects, a plurality of the musical tone data Ds generated in advance are stored in a work RAM 8, hereinafter referred to, and then these stored data are read out and synthesized. In the graphic processing, the effects-shared engine 7 performs various kinds of arithmetic operations using the work RAM 8 to give two-dimensional effects to the image data. For example, such arithmetic operations include a process for imparting random noise, a process for laying a picture on the original picture out of alignment to obtain a double image, a graduation process, and an edge enhancement process. In carrying out the above-mentioned processes, the effects-shared engine 7 and the work RAM 8 can be shared by the sound processing and the graphic processing, making it possible to simplify the construction.

In FIG. 2, reference numeral 9 designates a switch which is operable in synchronism with the time-sharing operation between the graphic processing and the sound processing, 10 a graphic buffer, and 11 a sound buffer. The switch 9 selectively delivers the musical tone data Ds' and the image data Dg' generated by the effects-shared engine 7 to the graphic buffer 10 and the sound buffer 11. The graphic buffer is formed of a buffer 10*a* and a buffer 10*b* which operate such that when at a certain time slot the image data Dg' is written into one buffer, the image data Dg' is read out from the other buffer, that is, writing and reading of data are alternately carried out. The sound buffer 11 is also formed of a buffer 11*a* and a buffer 11*b* which operate such that writing and reading of data are alternately carried out, similarly to the graphic buffer 10.

Reference numeral 12 designates a RAMDAC, which converts the image data Dg' read out from the graphic buffer 10 to an analog signal to generate an image signal. Reference numeral 13 designates a sound DAC, which converts the musical tone data Ds' read out from the sound buffer 11 to an analog signal to generate a musical tone signal.

With the above described construction, the graphic processing and the sound processing can share the PCI bus interface 3, 3DG and sound-shared buffer 4, texture and sound-shared memory 5, 3DG and WT tone generator-shared engine 6, effects-shared engine 7, and work RAM 8, which can simplify the construction.

Next, the operation of the data processing apparatus according to the present embodiment will be described with reference to FIG. 3 to FIG. 5C.

Figure 3:
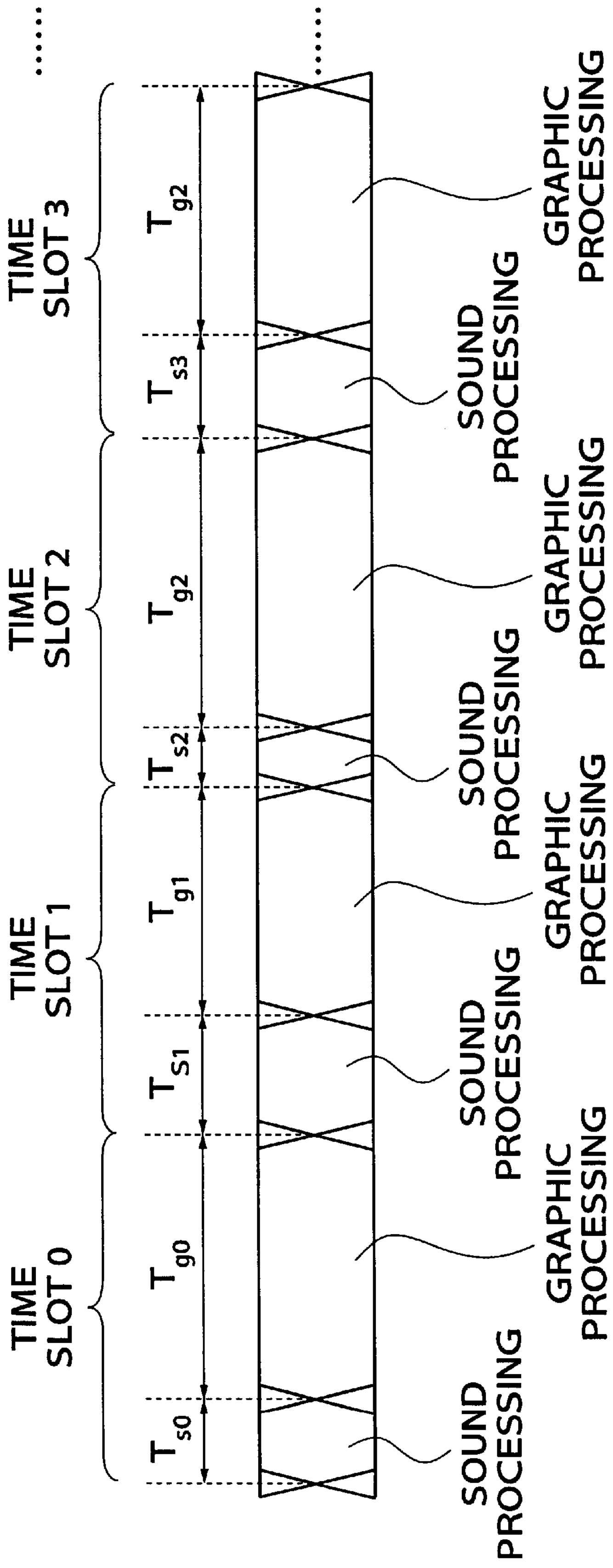
FIG. 3 is a timing chart showing a time-sharing operation for graphic processing and sound processing, performed by the apparatus of FIG. 2.

First, the operation of the whole data processing apparatus 100 will be described. FIG. 3 is a timing chart showing a time-sharing operation for graphic processing and sound processing, performed by the apparatus 100. As shown in the figure, the data processing apparatus 100 operates on time slots generated at time intervals of 5.3 ms as a basic unit, the graphic processing and the sound processing are executed in time-sharing manner in each time slot 0, 1, . . . The reason why the time interval between adjacent time slots is 5.3 ms is that if the sampling frequency of the musical tone data Dg' is 48 kHz, the number of samples for one time slot is 256, which is appropriate as a processing unit.

The sound processing is started immediately after the start of each time slot 0, 1, . . . In the illustrated example, a sound processing time period TS0, TS1, . . . is allocated for the sound processing. The number of musical tones to be simultaneously generated in the sound processing time period TS0, TS1, . . . dynamically changes, and accordingly a time period required for the sound processing changes with the number of musical tones to be simultaneously generated. Therefore, the sound processing time period TS0, TS1, . . . is not always constant. However, since the sounding processing time period is started immediately after the start of each time slot, it can never be too short for the sound processing to be completed. In each time slot, 256 samples of musical tone data Ds' are written into the buffers 11*a* and 11*b* of the sound buffer 11 alternately and read out from them alternately.

On the other hand, the graphic processing is started immediately after the completion of the sound processing time period and continued until the end of the corresponding time slot. In the illustrated example, a graphic processing time period Tg0, Tg1, is provided for the graphic processing. That is, the graphic processing is executed to the possible extent within a residual time period left after the completion of the sound processing time period. Consequently, the number of samples of image data Dg' written into the graphic buffer 10 changes. However, the operating speeds of the 3DG and WT tone generator-shared engine 6 and the effects-shared engine 7 are set to higher speeds than actually required and it will be unlikely that the graphic processing is not completed within the residual time period. If the graphic processing should not be completed within the residual time period, a data value in the immediately preceding frame can be used so as to avoid any visual unnaturalness.

Figure 4A:
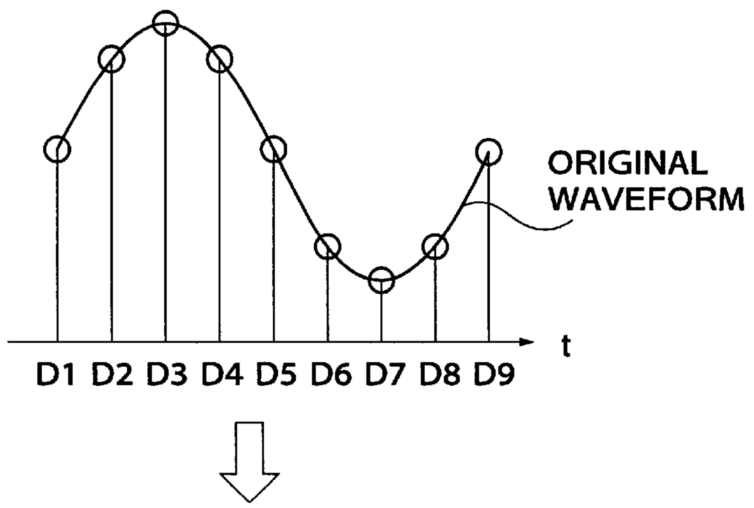
Figure 4B:
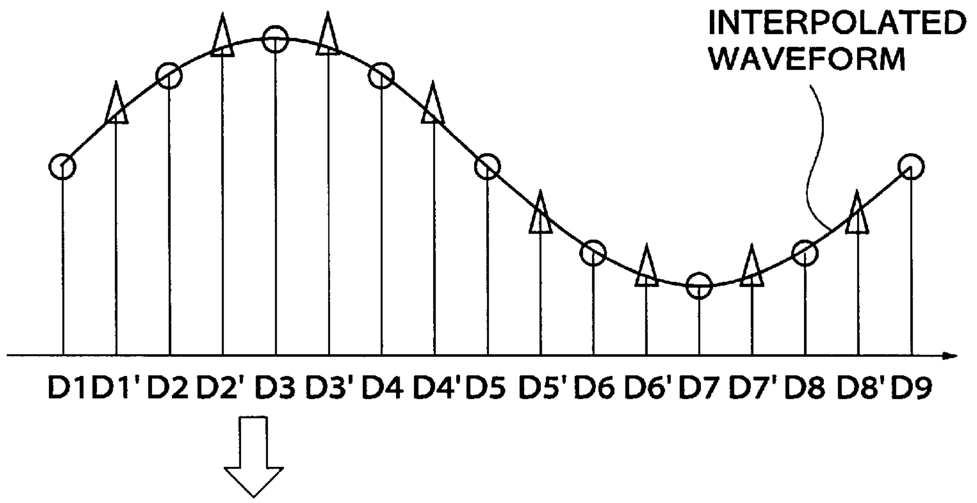
Figure 4C:
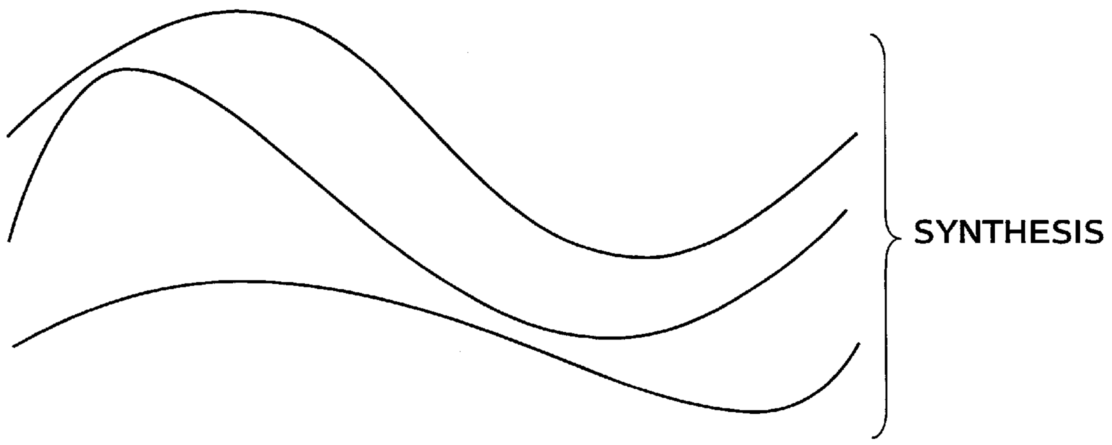

Next, internal processing carried out by the 3DG and WT tone generator-shared engine 6 will be described. FIGS. 4A to 4C are views useful in explaining the sound processing carried out by the 3DG and WT tone generator-shared engine 6. First, let it be assumed that wave table data Dw obtained by sampling an original waveform as shown in FIG. 4A is stored in the texture and sound-shared memory 5. In the illustrated example, the wave table data Dw is composed of pieces of data D1 to D9. Assuming that the pitch designated by the sounding control data Dh is half the pitch of the wave table data Dw, the 3DG and WT tone generator-shared engine 6 carries out an interpolating process using adjacent pieces of data. The interpolated waveform shown in FIG. 4B is a result of the interpolating process. For example, data D2' has been calculated by a formula of D2'=(D2+D3)/2.

If the musical tones to be simultaneously sounded are three, three interpolated waveforms corresponding to respective tone colors are obtained as shown in FIG. 4C. Then, the interpolated waveforms are multiplied by respective coefficient values corresponding to the volume designated by the sounding control data Dh, and the resulting products are added together to obtain musical tone data Ds.

Figure 5A:
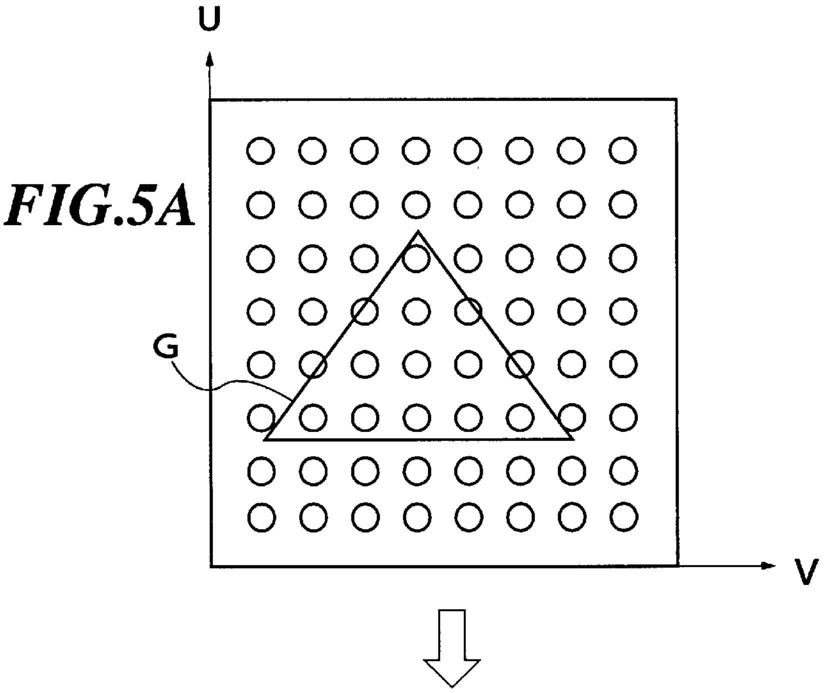
Figure 5B:
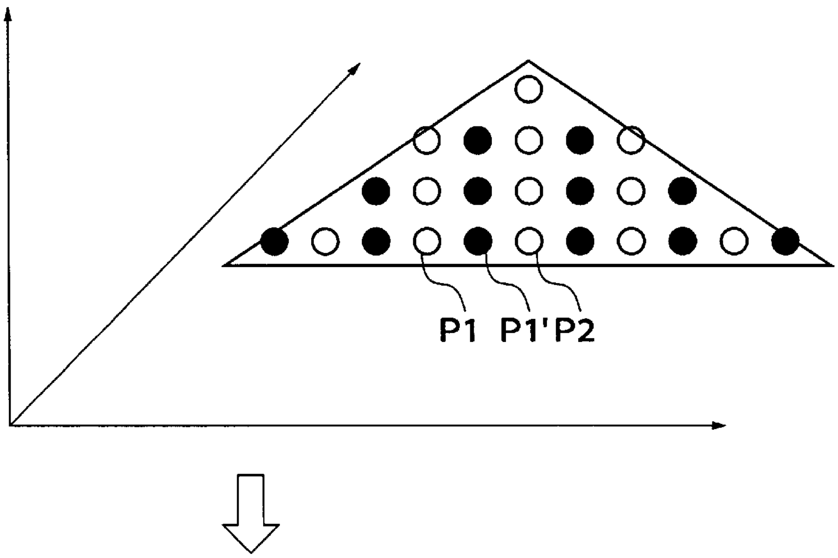
Figure 5C:
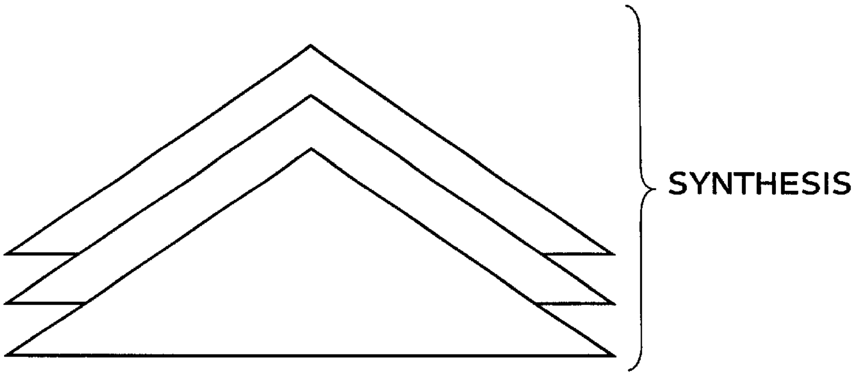

FIGS. 5A to 5C are views useful in explaining the graphic processing carried out by the 3DG and WT tone generator-shared engine 6. FIG. 5A shows texture data Dt in the form of a bit map. In the figure, white dots indicate pixels. In the illustrated example, a region corresponding to a polygon to be processed is represented by a triangle G. If coordinate information designated by the polygon data Dp indicates that the triangle G should be expanded in the transverse direction by a predetermined factor and inclined in the page space direction, the polygon on the display screen has a shape as shown in FIG. 5B. In the figure, the pixels in white dots indicate the actual data existing in the original texture data Dt and the pixels in black dots indicate data obtained by interpolation. For example, a pixel P1' is obtained by interpolation based upon adjacent pixels P1 and P2. If data indicating the pixel P1 is designated by Dp1, data indicating the pixel P1' Dp1', and data indicating the pixel P2 Dp2, the data Dp1' is calculated by a formula of Dp1'=(Dp1+Dp2)/2.

After data corresponding to each polygon has been prepared, $\alpha$ blending processing is carried out to add transparency to the data. More specifically, in the case where three polygons are displayed in a manner being laid one upon another, for example, data corresponding to each polygon is multiplied by a coefficient value corresponding to transparency designated by the polygon data Dp, and the resulting products are added together to obtain image data Dg.

As described above, according to the present embodiment, common processes to the sound processing and the graphic processing, which were conventionally carried out by separate systems, are carried out by a single system. More specifically, the PCI bus interface 3, 3DG and sound-shared buffer 4, texture and sound-shared memory 5, 3DG and WT tone generator-shared engine 6, effects-shared engine 7, and work RAM 8 are commonly used for the graphic processing and the sound processing. As a result, the number of component parts of the apparatus can be reduced to almost half.

Further, since the sound processing is carried out at an initial stage of each time slot, the musical tone data Ds can be surely generated. As a result, it prevents short processing time which generates discontinuous musical tone data Ds and thereby enables generation of a high-quality musical tone signal without any unnaturalness. Besides, once the sound processing has been completed, the graphic processing is carried out to the possible extent until the time slot terminates, which almost completely avoids that the processing for generating the image data Dg will not be completed in time. Even if the graphic processing should not be completed within the residual time period, a data value in the immediately preceding frame can be used, because the image data has very high correlation between frames, thereby generating an image signal with a very small degree of degradation in the image quality.

Although in the above described embodiment, the texture data Dt and the wave table data Dw are stored in the texture and sound-shared memory 5, the present invention is not limited to this. For example, there may be provided two separate memories, one for storing the texture data Dt and the other for storing the wave table data Dw.

Further, the PCI bus 3 may be replaced by an AGP bus. If the AGP bus is used, the texture and sound-shared memory 5 may not only be arranged on a sound and video-shared card, but also on a main memory of the system, to thereby enable reduction of the required capacity of each texture and sound-shared memory 5.

Although the 3DG and WT tone generator-shared engine 6 employed in the above described embodiment carries out interpolation or thinning processing and synthesis processing, it may be designed that the engine 6 does not carry out the synthesis processing.

What is claimed is:

1. A data processing apparatus for performing common processing on musical tone data and image data comprising:

a supply device that supplies original waveform data based upon which musical tone data are to be generated, and sounding control data containing kind information indicative of kinds of said original waveform data and pitch information indicative of pitches of said musical tone data, and supplies original image data based upon which image data are to be generated, and picture control data containing kind information indicative of kinds of said original image data and coordinate information indicative of coordinates of said image data on a display screen;

a storage device that stores both of said original waveform data and said original image data supplied from said supply device;

a common arithmetic processing device that performs interpolation processing or thinning processing on both of said original waveform data and said original image data, said common arithmetic processing device being operable upon receiving said sounding control data and said picture control data from said supply device, for reading out said original waveform data designated by said kind information of said sounding control data and said original image data designated by said kind information of said picture control data from said storage device, said common arithmetic processing device being operable for generating said musical tone data and said image data by subjecting said read original waveform data and said read original image data to said interpolation processing or said thinning processing according to said pitch information of said sounding control data and said coordinate information of said picture control data, respectively, said common arithmetic processing device being capable of processing both of said original waveform data and said original image data by processing in a time sharing manner;

a musical tone buffer that buffers said musical tone data generated by said common arithmetic processing device to generate said musical tone data in a continuous form; and an image buffer that buffers said image data generated by said common arithmetic processing device to generate said image data in continuous form.

2. A data processing apparatus as claimed in claim 1, wherein said musical tone buffer and said image buffer each comprise first and second buffers, said first and second buffers being disposed such that one of said first and second buffers is used for writing said musical tone data or said image data generated by said common arithmetic processing device and the other is used for reading said musical tone data or said image data written therein in one time slot, and vice versa in a next time slot.

3. A data processing apparatus as claimed in claim 1, wherein processing said original waveform data and said original image is executed in a time-sharing manner in each of time slots generated at equal time intervals and within which said processing can be almost completed, and in each of said time slots, a certain number of samples of said musical tone data are generated after start of said each of said time slots, and thereafter said image data are generated until termination of said each of said time slots.

4. A data processing apparatus as claimed in claim 3, wherein when said image data to be generated is not completely generated by the termination of said each of said time slots, an immediately preceding value of said image data generated is used as a value of a remainder of said image data applied in said each of said time slots.

5. A data processing apparatus as claimed in claim 1, wherein said storage device is arranged on a main memory of said data processing apparatus.

6. A data processing apparatus for performing common processing on musical tone data and image data comprising:

a supply device that supplies original waveform data based upon which musical tone data are to be generated, and sounding control data containing kind information indicative of kinds of said original waveform data, pitch information indicative of pitches of said musical tone data, and volume information indicative of volume of said musical tone data, and supplies original image data based upon which image data are to be generated, and picture control data containing kind information indicative of kinds of said original image data, coordinate information indicative of coordinates of said image data on a display screen, and transparency information indicative of transparency of said image data;

a storage device that stores both of said original waveform data and said original image data supplied from said supply device;

a common arithmetic processing device that performs interpolation processing or thinning processing, and synthetic processing on both of said original wave form data and said original image data, said common arithmetic processing device being operable upon receiving said sounding control data and said picture control data from said supply device, for reading out said original waveform data designated by said kind information of said sounding control data and said original image data designated by said kind information of said picture control data from said storage device, said common processing device being operable for generating said musical tone data and said image data by subjecting said read original waveform data and said read original image data to said interpolation processing or thinning processing according to said pitch information of said sounding control data and said coordinate information of said picture control data, respectively, and then executing said synthetic processing by synthesizing data obtained by said interpolation processing or said thinning processing on said read original waveform data and said read original image data according to said volume information of said sounding control data and said transparency information of said picture control data, respectively, said common arithmetic processing device capable of processing both of said original waveform data and said original image by processing in a time-sharing manner;

a musical tone buffer that buffers said musical tone data generated by said common arithmetic processing device to generate said musical tone data in a continuous form; and an image buffer that buffers said image data generated by said common arithmetic processing device to generate said image data in continuous form.

7. A data processing apparatus as claimed in claim 6, wherein said musical tone buffer and said image buffer each comprise first and second buffers, said first and second buffers being disposed such that one of said first and second buffers is used for writing said musical tone data or said image data generated by said arithmetic processing device and the other is used for reading said musical tone data or said image data written therein in one time slot, and vice versa in a next time slot.

8. A data processing apparatus as claimed in claim 6, wherein processing said original waveform data and said original image is executed in a time-sharing manner in each of time slots generated at equal time intervals and within which said processing can be almost completed, and in each of said time slots, a certain number of samples of said musical tone data are generated after start of said each of said time slots, and thereafter said image data are generated until termination of said each of said time slots.

9. A data processing apparatus as claimed in claim 8, wherein when said image data to be generated is not completely generated by the termination of said each of said time slots, an immediately preceding value of said image data generated is used as a value of a remainder of said image data applied in said each of said time slots.

10. A data processing method for performing common processing on musical tone data and image data comprising the steps of:

supplying original waveform data based upon which musical tone data are to be generated to a storage device, and sounding control data containing kind information indicative of kinds of said original waveform data and pitch information indicative of pitches of said musical tone data to a common arithmetic processing device, and supplying original image data based upon which image data are to be generated to said storage device, and picture control data containing kind information indicative of kinds of said original image data and coordinate information indicative of coordinates of said image data on a display screen to said common arithmetic processing device;

causing said common arithmetic processing device that performs interpolation processing or thinning processing on both of said original waveform data and said original image data to, upon receiving said sounding control data and said picture control data from said step of supplying, read out said original waveform data designated by said kind information of said sounding control data and said original image data designated by said kind information of said picture control data from said storage device and generate said musical tone data and said image data by subjecting said read original waveform data and said real original image data to said interpolation processing or said thinning processing according to said pitch information of said sounding control data and said coordinate information of said picture control data, respectively, said common arithmetic processing device being capable of processing both of said original waveform data and said original image data by processing in a time sharing manner;

buffering said musical tone data generated by said common arithmetic processing device to generate said musical tone data in continuous form; and buffering said image data generated by said common arithmetic processing device to generate said image data in continuous form.

11. A data processing method for performing common processing on musical tone data and image data comprising the steps of:

supplying original waveform data based upon which musical tone data are to be generated to a storage device, and sounding control data containing kind information indicative of kinds of said original waveform data, pitch information indicative of pitches of said musical tone data, and volume information indicative of volume of said musical tone data to a common arithmetic processing device, and supplying original image data based upon which image data are to be generated to said storage device, and picture control data containing kind information indicative of kinds of said original image data, coordinate information indicative of coordinates of said image data on a display screen, and transparency information indicative of transparency of said image data to said common arithmetic processing device;

causing said common arithmetic processing device that performs interpolation processing or thinning processing, and synthetic processing on both of said original waveform data and said original image data to, upon receiving said sounding control data and said picture control data from said step of supplying, read out said original waveform data designated by said kind information of said sounding control data and said original image data designated by said kind information of said picture control data from said storage device and generate said musical tone data and said image data by subjecting said read original waveform data and said real original image data to said interpolation processing or said thinning processing according to said pitch information of said sounding control data and said coordinate information of said picture control data, respectively, and then execute said synthetic processing by synthesizing data obtained by said interpolation processing or said thinning processing on said read original waveform data and said read original image data according to said volume information of said sounding control data and said transparency information of said picture control data, respectively, said common arithmetic processing device being capable of processing both of said original waveform data and said original image data by processing in a time sharing manner;

buffering said musical tone data generated by said common arithmetic processing device to generate said musical tone data in continuous form; and buffering said image data generated by said common arithmetic processing device to generate said image data in continuous form.

12. A machine readable storage medium storing instructions for causing a machine to execute a data processing method for performing common processing on musical tone data and image data comprising the steps of:

supplying original waveform data based upon which musical tone data are to be generated to a storage device, and sounding control data containing kind information indicative of kinds of said original waveform data and pitch information indicative of pitches of said musical tone data to a common arithmetic processing device, and supplying original image data based upon which image data are to be generated to said storage device, and picture control data containing kind information indicative of kinds of said original image data and coordinate information indicative of coordinates of said image data on a display screen to said common arithmetic processing device;

causing said common arithmetic processing device that performs interpolation processing or thinning processing on both of said original waveform data and said original image data to, upon receiving said sounding control data and said picture control data from said step of supplying, read out said original waveform data designated by said kind information of said sounding control data and said original image data designated by said kind information of said picture control data from said storage device and generate said musical tone data and said image data by subjecting said read original waveform data and said real original image data to said interpolation processing or said thinning processing according to said pitch information of said sounding control data and said coordinate information of said picture control data, respectively, said common arithmetic processing device being capable of processing both of said original waveform data and said original image data by processing in a time sharing manner;

buffering said musical tone data generated by said common arithmetic processing device to generate said musical tone data in continuous form; and buffering said image data generated by said common arithmetic processing device to generate said image data in continuous form.

13. A machine readable storage medium storing instructions for causing a machine to execute a data processing method for performing common processing on musical tone data and image data comprising the steps of:

supplying original waveform data based upon which musical tone data are to be generated to a storage device, and sounding control data containing kind information indicative of kinds of said original waveform data, pitch information indicative of pitches of said musical tone data, and volume information indicative of volume of said musical tone data to a common arithmetic processing device, and supplying original image data based upon which image data are to be generated to said storage device, and picture control data containing kind information indicative of kinds of said original image data, coordinate information indicative of coordinates of said image data on a display screen, and transparency information indicative of transparency of said image data to said common arithmetic processing device;

causing said common arithmetic processing device that performs interpolation processing or thinning processing, and synthetic processing on both of said original waveform data and said original image data to, upon receiving said sounding control data and said picture control data from said step of supplying, read out said original waveform data designated by said kind information of said sounding control data and said original image data designated by said kind information of said picture control data from said storage device and generate said musical tone data and said image data by subjecting said read original waveform data and said real original image data to said interpolation processing or said thinning processing according to said pitch information of said sounding control data and said coordinate information of said picture control data, respectively, and then execute said synthetic processing by synthesizing data obtained by said interpolation processing or said thinning processing on said read original waveform data and said read original image data according to said volume information of said sounding control data and said transparency information of said picture control data, respectively, said common arithmetic processing device being capable of processing both of said original waveform data and said original image data by processing in a time sharing manner;

buffering said musical tone data generated by said common arithmetic processing device to generate said musical tone data in continuous form; and buffering said image data generated by said common arithmetic processing device to generate said image data in continuous form.

* * * * *